(12) United States Patent
Jahkonen

(10) Patent No.: US 8,207,631 B2
(45) Date of Patent: Jun. 26, 2012

(54) POWER CONTROL OF A TRANSPORT SYSTEM

(75) Inventor: Pekka Jahkonen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 235 days.

(21) Appl. No.: 12/642,652

(22) Filed: Dec. 18, 2009

(65) Prior Publication Data

US 2010/0117566 A1   May 13, 2010

Related U.S. Application Data

(63) Continuation of application No. PCT/FI2008/000076, filed on Jun. 19, 2008.

(30) Foreign Application Priority Data

Jun. 20, 2007  (FI) .................................... 20070489

(51) Int. Cl.
*H02J 9/00* (2006.01)
*H02P 3/14* (2006.01)

(52) U.S. Cl. .......................................... 307/64; 318/376

(58) Field of Classification Search ............... 307/80, 307/64; 318/376
See application file for complete search history.

(56) References Cited

U.S. PATENT DOCUMENTS

| 4,545,464 A | 10/1985 | Nomura |
| 5,631,813 A * | 5/1997 | Ikeshita ......................... 363/37 |
| 7,246,686 B2 * | 7/2007 | Smith et al. ................... 187/290 |
| 2003/0089556 A1 | 5/2003 | Eilinger |

FOREIGN PATENT DOCUMENTS

| GB | 2106342 A | 4/1983 |
| GB | 2111251 A | 6/1983 |
| JP | 2005-223999 A | 8/2005 |
| JP | 2005223999 | * 8/2005 |

* cited by examiner

*Primary Examiner* — Michael Rutland Wallis
(74) *Attorney, Agent, or Firm* — Birch, Stewart, Kolasch & Birch, LLP

(57) ABSTRACT

The power control of a transport system comprises an electric motor for moving the transport appliance as well as a power supply appliance of the motor, which comprises an intermediate circuit. The power supply appliance of the motor is fitted between the power source and the electric motor. The transport system further comprises a network rectifier, which is fitted between the power source and the intermediate circuit of the power supply appliance of the motor for supplying braking power returning from the motor of the transport appliance to the power source.

8 Claims, 3 Drawing Sheets

POWER CONTROL OF A TRANSPORT SYSTEM

Figure 1:
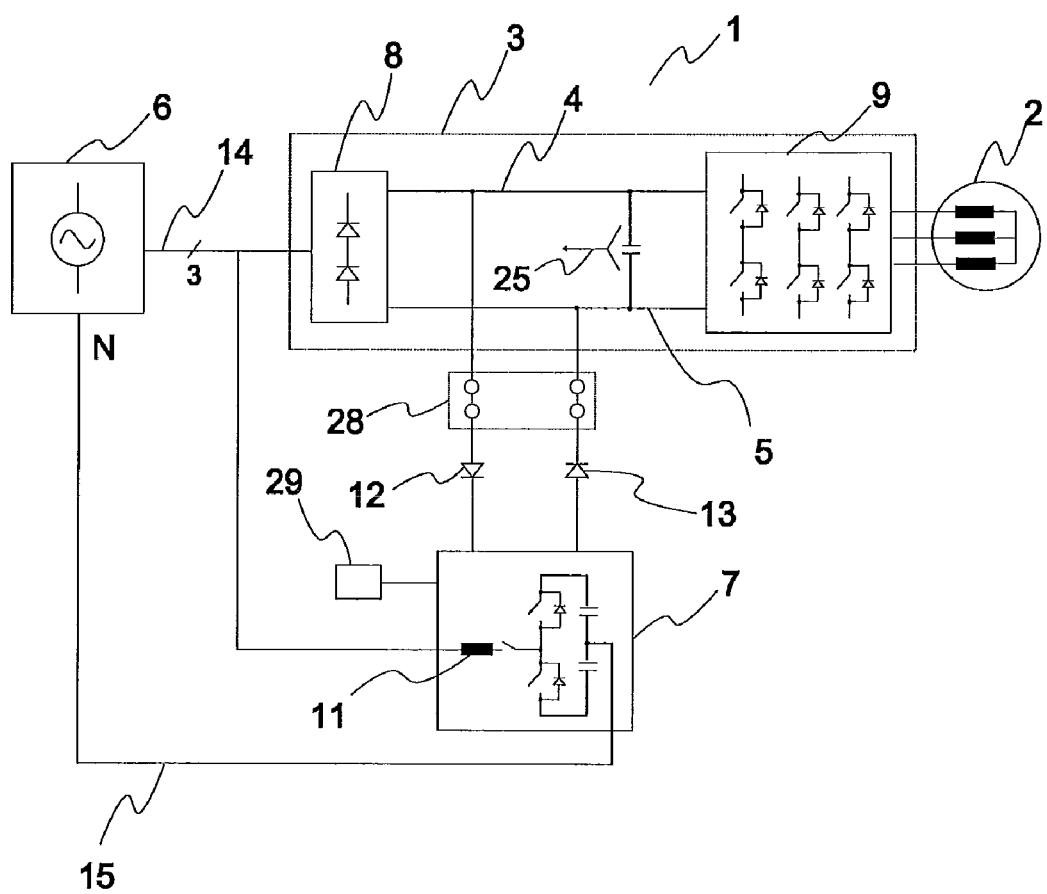

This application is a Continuation of co-pending PCT International Application No. PCT/FI2008/000076 filed on Jun. 19, 2008, which designated the United States, and on which priority is claimed under 35 U.S.C. §120. This application also claims priority under 35 U.S.C. §119 on Patent Application No. 20070489 filed in Finland on Jun. 20, 2007. The entire contents of each of the above documents is hereby incorporated by reference.

FIELD OF THE INVENTION

The object of the invention is a power control of a transport system that includes an electric motor for moving the transport appliance as well as a power supply appliance of the motor, the power supply including an intermediate circuit and being fitted between the power source and the electric motor. The object of the invention is also a method for controlling the power of a transport system in which a network rectifier is fitted between the intermediate circuit of the power supply appliance of the motor and the power source for supplying braking power returning from the motor to the power source.

PRIOR ART

In a transport system power is supplied to the motor for moving the transport appliance. Power supply to the motor generally occurs by means of a frequency converter. When braking the transport appliance, power also returns from the motor to the frequency converter, where it is generally converted into heat, especially in low-power systems, in a separate power resistor. In higher-powered systems the braking power of the motor is normally returned to the network by means of a network inverter-rectifier.

Publication U.S. Pat. No. 4,545,464 presents an elevator system in which the braking power returning from the motor is supplied to the electrification of the elevator system.

PURPOSE OF THE INVENTION

The purpose of this invention is to disclose a simple power control of a transport system for supplying braking power back to the network. Furthermore the invention includes a concept for minimizing the harmonics of the current supplied to the network.

CHARACTERISTIC FEATURES OF THE INVENTION

The power control of a transport system according to the invention comprises a network rectifier, which is fitted between the aforementioned power source and the intermediate circuit of the power supply appliance of the motor for supplying braking power returning from the motor of the transport appliance to the power source. The method according to the invention for controlling the power of a transport system includes a network rectifier being fitted between the intermediate circuit of the power supply appliance of the motor and the power source for supplying braking power returning from the motor to the power source. Other features of the invention include what is disclosed in the claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

The power supply appliance of the motor according to the invention can be a controller of an AC motor, such as a frequency converter, or on the other hand the power supply appliance can be e.g. a power rectifier of an H-bridge DC motor.

The transport system referred to in the invention can be, for instance, an elevator system, an escalator system, a travelator system or a crane system. A transport appliance refers in this context to a part of a transport system, which is used to move passengers or goods.

The power control of a transport system according to the invention comprises an electric motor for moving the transport appliance as well a power supply appliance of the motor, which comprises an intermediate circuit and which power supply appliance of the motor is fitted between the power source and the electric motor. One transport system according to the invention comprises a network rectifier, which network rectifier is fitted between the aforementioned power source and the intermediate circuit of the power supply appliance of the motor for supplying braking power returning from the motor of the transport appliance to the power source.

One power supply appliance of a motor according to the invention comprises a DC rectifier fitted in connection with the power source, an inverter fitted in connection with the electric motor and supplying variable amplitude and variable frequency voltage to the electric motor, and also an intermediate circuit between the DC rectifier and the inverter.

One network rectifier according to the invention comprises a changeover switch and a choke. The aforementioned network rectifier is fitted to the intermediate circuit of the power supply appliance of the motor via diodes connected to its positive and negative intermediate circuit busbar. The network rectifier according to the invention can also operate without the aforementioned diodes, but the diodes ensure that power flowing from the network to the motor of the transport system is not possible as a result of e.g. malfunctioning of the network rectifier. Mechanical controllable switches, such as relays or contactors, or semiconductor switches such as IGBT transistors, can be used instead of the diodes.

In one power control according to the invention the power source comprises a single-phase or multiphase AC electricity system comprising a neutral wire. In this case the network rectifier is single-phase, comprising only one choke as well as only one changeover switch. The choke is fitted between the phase of the AC electricity system and the center point of the changeover switch of the network rectifier, at least two capacitors in series are connected in parallel with the changeover switch, and the neutral wire is connected to the center point of the capacitors.

In one embodiment of the invention at least one interference filtering choke is connected in series with the neutral wire of the AC electricity system for filtering interference caused by the network rectifier. The aforementioned choke can be an RF choke, in which case it is used for filtering only high-frequency, over 150 kilohertz, interference. The choke can also be intended for filtering lower-frequency interference, such as changes in the current of the switching frequencies of the network rectifier. It is also possible that the choke of the network rectifier fitted to a phase of the network is divided into two parts, and the second of the aforementioned chokes is fitted to the neutral wire.

In one power control according to the invention the power source is formed from a two-phase or multiphase AC electricity system, which does not necessarily comprise a neutral wire, the network rectifier comprises a first and a second changeover switch as well as a first and a second choke, and the first choke is fitted between the first phase of the AC electricity system and the center point of the first changeover switch, and the second choke is fitted between the second phase of the AC electricity system and the center point of the second changeover switch In one power control according to the invention a controllable switch, which is fitted to close when the intermediate circuit voltage has reached a pre-determined limit value, is fitted in series with at least one choke. The pre-determined limit value can be, for instance, 350 volts.

In one power control according to the invention a connector is disposed on the negative and positive busbar of the power supply appliance of the motor for electroconductively connecting a second power supply appliance to the power supply appliance of the motor.

In one power control according to the invention the network rectifier comprises a rectifier control, measurement of the intermediate circuit voltage, measurement of the current of the choke and measurement of the phase voltage of the power source, and the network rectifier is fitted to form, by means of the measurements of the phase voltage and of the intermediate circuit voltage, a reference value for the phase current and to adjust the current of the choke according to the reference value with the rectifier control.

In one power control according to the invention the rectifier control comprises a first and a second limit value of intermediate circuit voltage, of which the first limit value is greater than the second limit value. The network rectifier is fitted to start the power supply from the intermediate circuit to the power source after the intermediate circuit voltage has exceeded the first limit value and to stop the power supply from the intermediate circuit to the power source after the intermediate circuit voltage has fallen below the second limit value. In other words, in this case the first and the second limit value form hysteresis limits for the starting and the stopping of the power supply.

In another power control according to the invention the rectifier control comprises only one limit value. The network rectifier is in this case fitted to start the power supply from the intermediate circuit to the power source after the intermediate circuit voltage has exceeded the limit value and to stop the power supply after the intermediate circuit voltage has fallen below the limit value.

In one method according to the invention for controlling the power of a transport system a network rectifier is fitted between the intermediate circuit of the power supply appliance of the motor and the power source for supplying braking power returning from the motor to the power source.

In one method according to the invention:
 the intermediate circuit voltage is measured
 the intermediate circuit voltage is compared to the first limit value of the intermediate circuit voltage
 the power supply from the intermediate circuit to the power source is started with the rectifier control when the intermediate circuit voltage has exceeded the first limit value
 the intermediate circuit voltage is compared to the second limit value of the intermediate circuit voltage
 the power supply from the intermediate circuit to the power source is stopped with the rectifier control when the intermediate circuit voltage has fallen below the second limit value In one method according to the invention after the rectifier control has started power supply from the intermediate circuit to the power source:
 the current of the choke is measured
 the phase voltage is measured
 the intermediate circuit voltage is measured
 a reference value of the current of the choke is formed at least partly by means of the measurements of the phase voltage and of the intermediate circuit voltage
 the current of the choke is adjusted according to the reference value with the rectifier control The transport system of the invention can also be an elevator system.

The power control can comprise accumulator cells and/or a supercapacitor, as well as a charging circuit fitted to the intermediate circuit for charging and discharging the aforementioned accumulator cells and/or supercapacitor.

In one embodiment of the invention IGBT transistors are preferably used as the changeover contacts of the changeover switches of the network rectifier.

The power source according to the invention can also be mains voltage i.e. a network.

ADVANTAGES OF THE INVENTION

With the invention at least one of the following advantages is achieved:
 Since it is possible with the power control according to the invention to supply the braking energy of the motor of the transport system back to the mains network, the efficiency ratio of the transport system improves. In prior-art transport systems, braking energy is e.g. converted into heat in power resistors reserved for the purpose.
 In transport systems, in which the ratio of the braking power returning from the motor to the power returned to the network is small, the power can be returned to the network with the structurally simple network rectifier according to the invention. This kind of transport system is, for instance, the kind of elevator system in which a large part of the braking energy of the elevator is consumed in friction losses. It is also possible to connect a DC/AC transformer, with which power is supplied to the electrification of the elevator, to the intermediate circuit of the power supply appliance of the motor. This also reduces the power to be returned to the network in connection with braking of the elevator. It is further possible to connect a separate energy storage in connection with the power control, such as an accumulator or a supercapacitor, in which case at least a part of the braking power is supplied to the energy storage. This also reduces the power returning to the network.
 The network rectifier according to one embodiment of the invention is single-phase, in which case it is possible to supply returning power to one phase between the phase of the network and the neutral wire, in which case a neutral wire is needed but the structure of the network rectifier is then as simple as possible. According to another embodiment of the invention it is possible to supply returning power to two phases between two phases of the network by means of two changeover switches and two chokes, in which case no separate neutral wire is needed in the network.
 By means of the network rectifier according to the invention it is possible to control current returned to the network to be sinusoidal, in which case the harmonics of the network current diminish.

It is possible to retrofit the network rectifier according to the invention in connection to the power supply appliance of the motor, such as a frequency converter, e.g. in connection with modernization of the transport system. In this case it is possible e.g. to easily replace the braking resistor completely or partly with a modular network rectifier and to improve the efficiency ratio of an existing transport system.

PRESENTATION OF DRAWINGS

Figure 2:
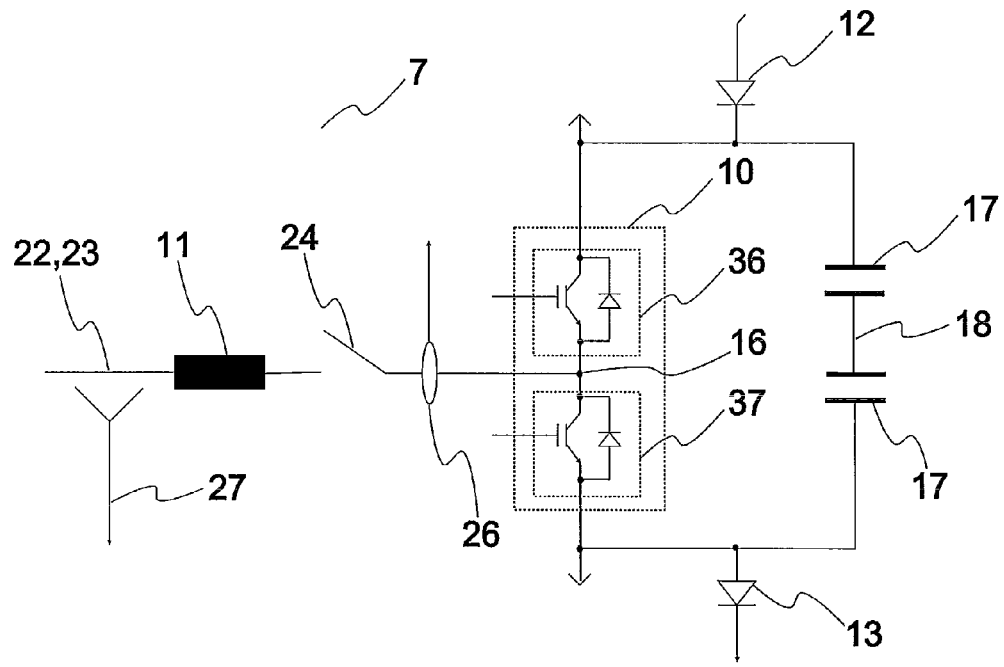
Figure 3:
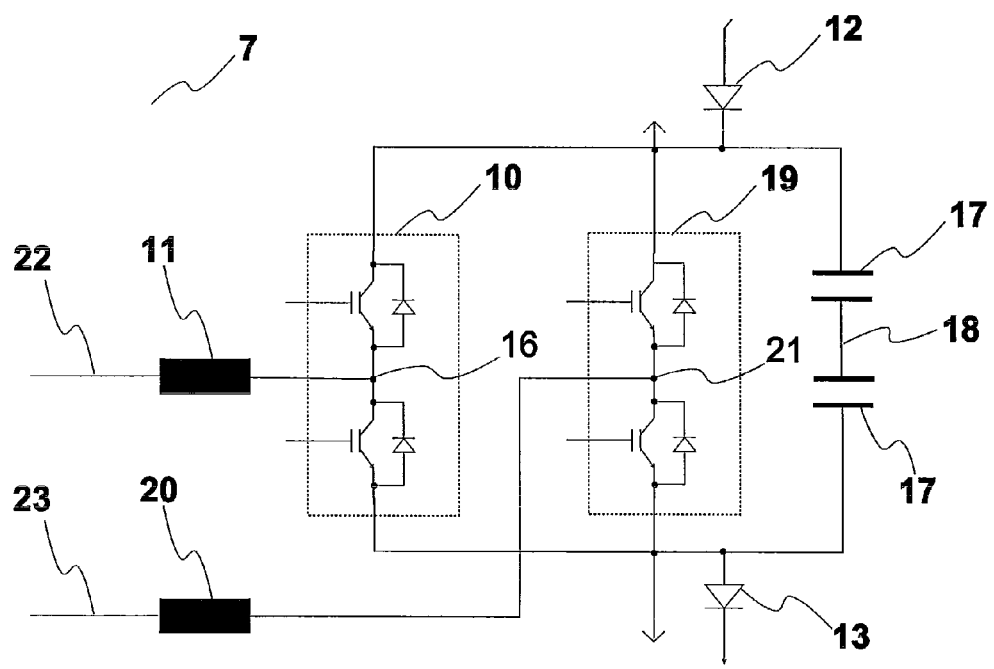
Figure 4:
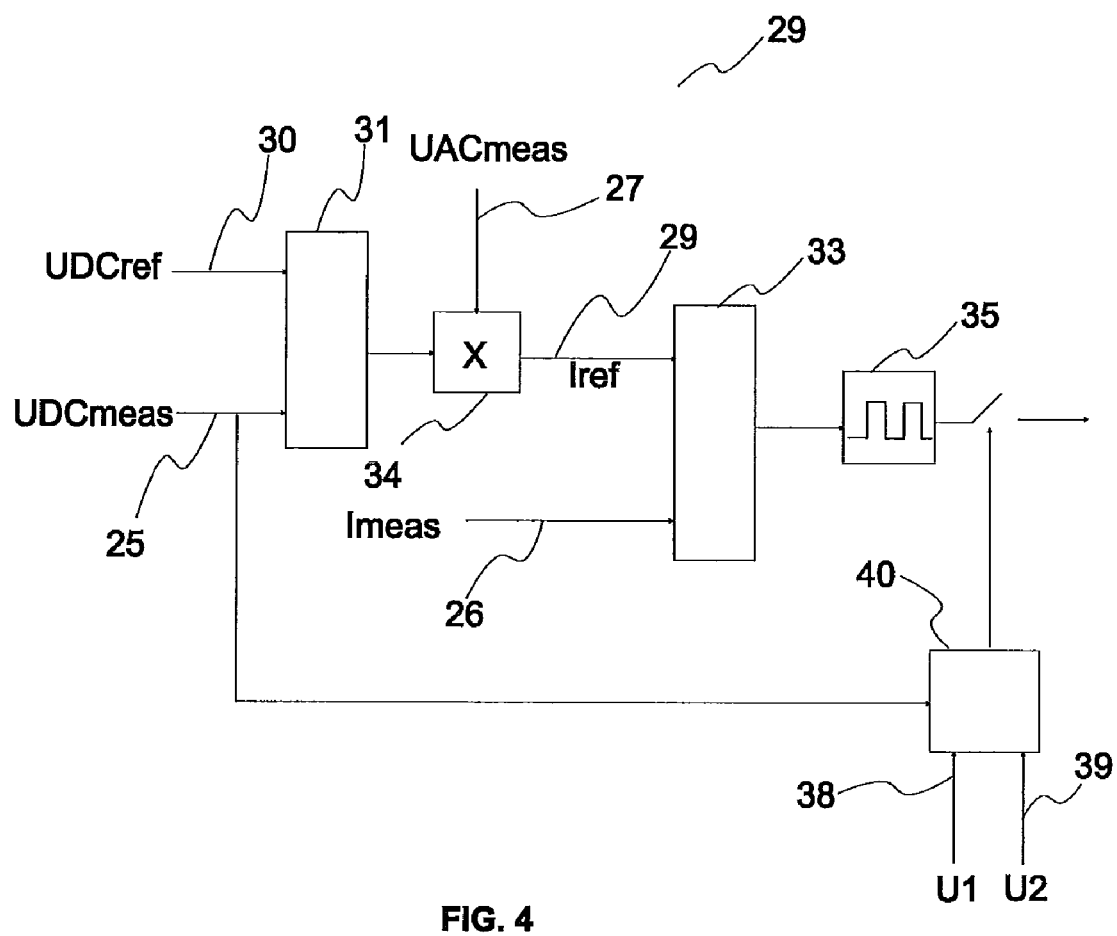

In the following, the invention will be described in more detail by the aid of a few examples of its embodiments with reference to the attached drawings, wherein FIG. 1 presents a power control of a transport system according to the invention FIG. 2 presents a network rectifier according to the invention FIG. 3 presents a network rectifier according to the invention FIG. 4 presents a rectifier control as a block diagram FIG. 1 presents a power control of a transport system according to the invention. In this embodiment of the invention the transport system is an elevator system. In this context the power supply appliance 3 of the motor is a frequency converter, comprising a DC rectifier 8, an intermediate circuit 4,5 and an inverter 9. The frequency converter 3 supplies power from the network 6 to the motor 2 that moves the elevator car (not shown in the figure). The network rectifier 7 is fitted to the intermediate circuit of the frequency converter via the diodes 12,13. The diode 12 is fitted to conduct current from the positive busbar 4 of the intermediate circuit of the frequency converter to the collector of the positive changeover contact 36 of the changeover switch 10 of the network rectifier. The diode 13 is fitted to conduct current from the emitter of the negative changeover contact 37 of the changeover switch 10 of the network rectifier 7 to the negative busbar 5 of the intermediate circuit of the frequency converter. The diodes connected in this way prevent the supply of power from the network 6 to the elevator motor 2 via the network rectifier 7, which is important from the standpoint of the safety of the elevator system, because in this case malfunctioning of the network rectifier 7 does not in a fault situation enable the flow of power creating torque to the elevator motor 2 from the mains network 6. The network rectifier 7 comprises a rectifier control 29, with which the power from the intermediate circuit 4,5 of the frequency converter to the mains network 6 is controlled. The rectifier control starts after the intermediate circuit voltage has risen above the pre-determined first limit value 38, and stops after the intermediate circuit voltage has fallen below the second pre-determined limit value 39. In other words, the limit values form hysteresis limits for the rectifier control, in which case it is not possible that with a certain value of intermediate circuit voltage the control would start to switch on and off at a high frequency.

The frequency converter 3 as well as the network rectifier 7 contain connectors 28 for electroconductively connecting the network rectifier to the frequency converter. It is possible to connect the network rectifier 7 to the frequency converter 3, e.g. in connection with the modernization of an elevator, by replacing the braking resistor connected for handling braking power in connection with the intermediate circuit 4,5 of the frequency converter either completely or partly with the network rectifier 7.

FIG. 2 describes a single-phase network rectifier 7 according to the invention in more detail. Two capacitors 17 in series are connected in parallel with the controllable changeover switch 10. The neutral wire 15 of the network 6 is connected to the center point 18 of the capacitors (connection not shown in figure). A choke 11 is connected between the center point 16 of the changeover switch 16 and the network supply 22,23. In this embodiment of the invention a controllable switch 24 is also fitted in series with the choke. The controllable switch closes after the intermediate circuit voltage has risen to a pre-determined limit value, which is here 350 volts. By means of the controllable switch 24 a possible surge current caused by sudden charging of the capacitors 17 in connection with the closing of the main contactor of the network is prevented. It is however possible that the network rectifier 7 does not comprise a controllable switch 24.

The network rectifier 7 also comprises a measurement 26 of the current of the choke as well as a measurement 27 of the current of the phase voltage. The network rectifier endeavors to adjust the current of the choke with the rectifier control 29. The magnitude of the current is changed by switching the positive 36 or the negative 37 contact of the changeover switch 10 in turns to the potential of the positive 4 and the negative 5 busbar of the intermediate circuit of the frequency converter. The controlled current travels between the phase 22,23 of the network and the neutral wire 15. Pulse-width modulation (PWM modulation) is used for the control of the switches. IGBT transistors are used as the changeover contacts.

FIG. 3 presents another network rectifier 7. In this case the network rectifier comprises a first 10 and a second 19 controllable changeover switch. The network rectifier 7 according to the figure also comprises a first 11 and a second 20 choke. The first choke 11 is fitted between the first phase 22 of the network and the center point 16 of the first changeover switch and the second choke 20 is fitted between the second phase 23 of the network and the center point 21 of the second changeover switch. Controllable switches 24 can also be in series with both chokes, but they are not shown in the figure. No measurements 26 of the currents of the chokes or measurements 27 of the phase voltages are shown in the figure either. The network rectifier 7 of FIG. 3 does not comprise a neutral wire, but instead the current controlled through the chokes passes between two phases of the network. The rectifier control 29 adjusts the first changeover switch 10 by controlling the current of the first choke 11 and the second changeover switch 19 by controlling the current of the second choke 20 such that the currents of the chokes are in opposite phases and of the same magnitude in terms of their amplitude.

FIG. 4 presents a rectifier control 29 of the network rectifier in more detail. The intermediate circuit voltage 25 of the frequency converter 3 is measured and compared by the comparator 40 to the first limit value 38 (U1) of intermediate circuit voltage, which can be, for instance, 680 volts. After the intermediate circuit voltage has increased to be greater than the first limit value 38, the comparator 40 gives permission to the rectifier control 29 to start to control the power from the intermediate circuit 4,5 of the frequency converter to the network 6 with the network rectifier 7. In this case the intermediate circuit voltage 25 starts to fall. The comparator 40 compares the intermediate circuit voltage to the second limit value 39 (U2), which can be, for instance, 650 volts. After the intermediate circuit voltage has decreased to below the second limit value 39, the comparator commands the rectifier control to stop the power supply of the network rectifier 7.

The amplitude of the current reference of the choke 11, 20 is determined by comparing the reference value 30 of the intermediate circuit voltage of the frequency converter to the measured intermediate circuit voltage 25 with the current regulator 31. The reference value of the intermediate circuit voltage can be, for instance, 650 volts. The amplitude grows in proportion to the difference of the reference values and the actual values of the intermediate circuit voltage. The reference value 29 of the current of the choke is formed by means of the measured phase voltage 27 of the network such that the reference value of the current is determined for the same phase as the measured phase voltage. It is endeavored that the measured current 26 of the choke is adjusted in the current regulator 33 according to the current reference 29 such that the modulator 35 is controlled by means of the current regulator, by means of which the switching reference of the changeover switch 10,19 is formed. A pulse width modulator functions as the modulator, in which case the width of the control pulse of the changeover switch is changed according to the output of the current regulator.

In another embodiment the rectifier control 29 does not contain a current regulator 31 at all, but instead the amplitude of the current reference 29 is a constant. In this case after the rectifier control has started power supply from the intermediate circuit 4,5 to the mains network 6 with the network rectifier 7, the current supplied to the mains network is a constant according to the current reference 29 in terms of its amplitude and of the same phase as the measured phase voltage 27 of the mains network.

The invention is not limited solely to the embodiments described above, but instead many variations are possible within the scope of the inventive concept defined by the claims below.

The invention claimed is:

1. Power control of a transport system, the power control comprising:
    an electric motor for moving the transport appliance;
    a power supply appliance of the motor, the power supply including an intermediate circuit and said power supply appliance being fitted between a power source and the electric motor, and
    a network rectifier fitted between said power source and the intermediate circuit such that the rectifier is configured to supply braking power returning from the electric motor the power source, the network rectifier being single-phase and including only one choke and only one changeover switch; and
    wherein
        the network rectifier is fitted to the intermediate circuit via diodes connected to positive and negative intermediate circuit busbars;
        the power source is formed of a single-phase or multiphase AC electricity system including a neutral wire,
        said choke is fitted between the phase of the AC electricity system and a center point of said changeover switch,
        at least two capacitors in series are connected in parallel with said changeover switch, and
        said neutral wire is connected to a center point of the capacitors.

2. Power control of a transport system, the power control comprising:
    an electric motor for moving the transport appliance;
    a power supply appliance of the motor, the power supply including an intermediate circuit and said power supply appliance being fitted between a power source and the electric motor, and
    a network rectifier fitted between said power source and the intermediate circuit such that the rectifier is configured to supply braking power returning from the electric motor the power source, the network rectifier including first and second changeover switches and first and second chokes; and
    wherein
        the network rectifier is fitted to the intermediate circuit via diodes connected to positive and negative intermediate circuit busbars;
        the power source is formed from a two-phase or multiphase AC electricity system,
        where the first choke is fitted between the first phase of the AC electricity system and a center point of the first changeover switch, and
        the second choke is fitted between the second phase of the AC electricity system and a center point of the second changeover switch.

3. A control according to claim 1, wherein the transport system is an elevator system.

4. Power control according claim 1 or 2, the power supply appliance further comprising:
    a DC rectifier fitted in connection with the power source, and
    an inverter fitted in connection with the electric motor and supplying variable amplitude and variable frequency voltage to the electric motor, and
    wherein the intermediate circuit is fitted between the DC rectifier and the inverter.

5. Power control according to claim 1, further comprising:
    a controllable switch configured to close when an intermediate circuit voltage has reached a pre-determined limit value, said controllable switch being fitted in series with at least one choke.

6. Power control according to claim 2, further comprising:
    a connector fitted to positive and negative intermediate circuit busbars of the power supply appliance; and
    a connector for electroconductively connecting the network rectifier to the power supply appliance of the motor is fitted in connection with diodes connecting the network rectifier to the positive and the negative intermediate circuit busbars.

7. Power control according to claim 4, the network rectifier comprising:
    a rectifier control,
    measurement of the intermediate circuit voltage,
    measurement of the current of the choke; and
    measurement of the phase voltage of the power source,
    wherein the network rectifier is configured to
        generate, based on the measurements of the phase voltage and of the intermediate circuit voltage, a reference value for the phase current; and
        adjust the current of the choke according to the reference value with the rectifier control.

8. Power control according to claim 7, the rectifier control including a first and a second limit value of intermediate circuit voltage, of which the first limit value is greater than the second limit value,
    wherein the network rectifier is fitted to start power supply from the intermediate circuit to the power source after the intermediate circuit voltage has exceeded the first limit value and to stop power supply from the intermediate circuit to the power source after the intermediate circuit voltage has fallen below the second limit value.

* * * * *